May 28, 1957 T. P. PAJAK 2,793,718
HONEYCOMB PANEL AND METHOD OF MAKING SAME
Filed Jan. 25, 1950
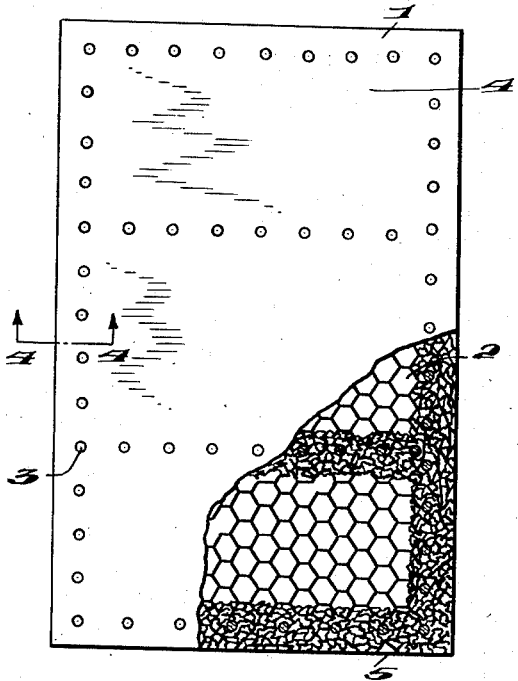
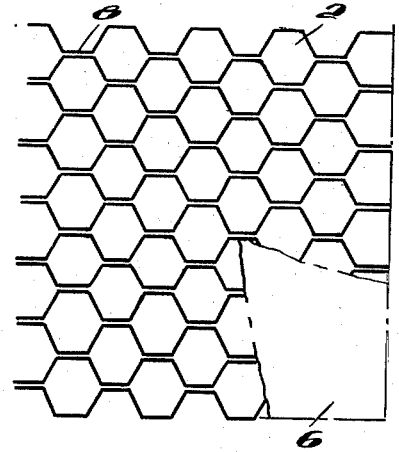
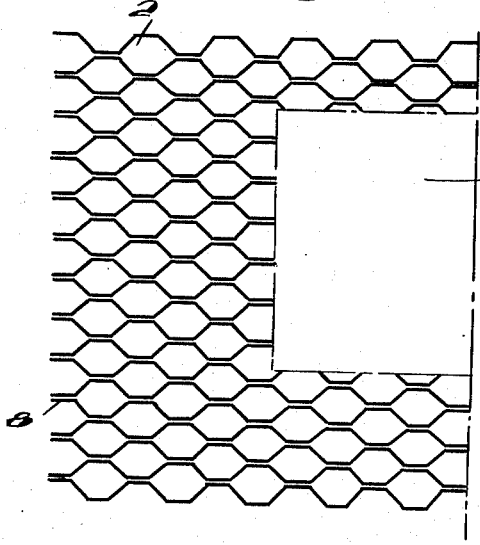
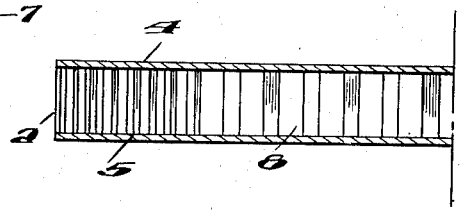
INVENTOR.
THEODORE P. PAJAK,
BY
ATTORNEY

United States Patent Office 2,793,718
Patented May 28, 1957

2,793,718

HONEYCOMB PANEL AND METHOD OF MAKING SAME

Theodore P. Pajak, Baltimore, Md., assignor to The Glenn L. Martin Company, Middle River, Md., a corporation of Maryland Application January 25, 1950, Serial No. 140,397

7 Claims. (Cl. 189—34)

This invention relates to honeycomb construction and more particularly to paneling and a method of making the same whereby its compressive strength is increased locally by densifying.

Ordinary solid paneling, commonly used in the past for enclosures, flooring, siding etc., incorporates in its design numerous disadvantages which are non-existent in the new honeycomb panel. Where weight considerations are paramount, solid paneling offers little in the way of efficiency. The inability of the ordinary paneling to resist bending forces can be overcome only by increasing its thickness or by using external bracing. These methods of obtaining stiffness increase the weight of a panel structure greatly and even then they are not as uniformly stiff as the new type sandwich paneling. The solid panel construction has therefore become unsatisfactory in meeting the needs, especially in the field of highspeed aircraft design where strength-weight considerations have become increasingly important.

Honeycomb sandwich panel construction increases rigidity without appreciably increasing the weight by use of a very lightweight core interposed between sheets of solid metal. This structure places the greater mass of material near the surface where it can more efficiently resist the forces tending to cause bending, as verified by theoretical treatment. Such rigidity as is obtained from this construction allows efficient design heretofore impossible. The most difficult problem in the use of such construction becomes apparent when this new paneling is bolted or riveted to an adjoining structure because the local compressive strength of the panel is not high enough to prevent local failure of the core. To design the complete panel for those local stresses would produce an overweight structure, which would probably be no better weightwise, than the ordinary paneling described earlier. This invention solves the very problem which has stunted the progressive use of honeycomb paneling. A new method of fabricating such a structure has been invented whereby its compressive strength may be locally controlled.

It is an object of this invention to improve sandwich construction paneling by increasing its compressive strength locally where desired.

It is an object of this invention to permit sandwich construction paneling to be riveted without crushing.

It is an object of this invention to disclose a method of locally densifying honeycomb core material uniformly and where desirable.

It is an object of this invention to disclose a method which will prevent edge damage and improve the appearance of honeycomb paneling.

In the drawing:

Figure 1 is a view of a panel having a cutaway portion showing the densified honeycomb core.

Figure 2 is a view of a corner section of honeycomb core before densifying and after the cutting operation.

Figure 3 is a view of a section of honeycomb core before densifying inboard of a corner.

Figure 4 is an enlarged sectional view taken on the line 4—4 in Figure 1 showing a portion of the panel in a densified area of the core.

The honeycomb material shown in the drawings is constructed of very thin aluminum foil, usually 2 to 6 thousandths of an inch in thickness. A plurality of strips are formed so that when secured to one another, in proper relationship, individual hexagonal cells are produced having two double-thickness walls 8 in each cell, the longitudinal direction of which is parallel to all other double thickness walls in the undensified core. The size of the hexagonal cells may be different for any particular application, depending upon strength-weight considerations. These possible variations in cell sizes are illustrated in the drawings. Spacing between double-thickness walls 8 shown in Figures 2 and 3 is merely for the purpose of better illustrating the construction of core 2 wherein the adjoining walls are actually bonded together.

The double-thickness walls introduce a peculiar action when the cell walls are forced inwardly in close relation to one another. Applying a compressive force parallel to the longitudinal direction of double-thickness walls 8 causing the cells to collapse, commonly called densifying, yields substantially no change in the dimensions perpendicular to the compressive force. However, applying the compressive force perpendicular to the longitudinal direction of double-thickness cell walls 8 does cause an increase in dimensions perpendicular to the compressive force. This action of core 2 upon being densified complicates the formation of a structure as set forth in the objects and described herebelow.

Panel 1 as shown in Figure 1 is made up of two sheets of metal 4 and 5 and a slab of locally densified honeycomb core 2, all secured together. Sheet 4 and the similar sheet 5 are securely bonded to the open celled surfaces of core 2 producing the effective resistance to bending forces. The densified core areas which are effectively resistant to compressive forces are an integral part of the lightweight undensified cells of core 2. Rivets 3 extend through panel 1 at areas of the densified core for connecting the structure to framework or to another panel. The densified core provides sufficient local compressive strength to prevent failure around rivets 3.

The method of producing the locally reinforced panels is as follows. Reinforcing sheets 4 and 5 are laid out to the ultimately desired plan form dimensions and a slab of honeycomb core 2 is laid out larger than the plan form dimension of sheets 4 and 5, by the amount of densifying to be done so that after the cells are collapsed in the desired areas the dimensions will conform to the dimension of the sheets. The areas to be densified and the amount of densifying is easily determined for any particular installation, being dependent upon the amount and location of the compressive force to be resisted. After laying out core 2, preparatory to being densified, portions of core 2 are removed in the areas where the densified portions are to intersect. In panel 1 those intersecting areas appear at corners and at the edge inboard from the corners. To prevent the development of non-uniform densified areas and secondary stresses within core 2, generally triangular portions 6 are cut out of the corners and generally rectangular portions 7 are cut out of the inboard edge intersecting areas of core 2. These cut out portions may vary in size and shape however, and for any particular application certain sizes and shapes appear to give more desirable densifying action, depending upon core thickness, cell size and the amount of densifying to be done. After the core is laid out and the cut out portions are removed therefrom preparatory to densifying, the core is preferably placed on a flat surface and a compressive force is applied generally perpendicular to the cell axes in the areas to be compressed, causing the cell walls to collapse into close relationship with one another for increasing the compressive strength of the core in those areas. The resulting structure having areas of the cellular core collapsed perpendicular to the plane of the core is commonly referred to as a densified core. The size of cut out portions 6 and 7 in core 2 are such that as the densifying is being done the areas become smaller and smaller due to the flow of the core and finally the cut outs are completely filled in when the densifying is completed to produce a core as shown in Figure 1, having uniformly densified areas free from secondary stresses and warpage. Core 2 upon being densified conforms to the plan form size of sheets 4 and 5 and is ready to be sandwiched therebetween. A thermosetting adhesive is preferably applied to the open celled surfaces of densified core 2 and to one surface of each of sheets 4 and 5 whereupon the core is sandwiched between the sheets having the adhesive on the core adjacent the adhesive on the sheets. The adhesive may be applied to only one of the adjoining surfaces without departing from the method; however, it is found that a better bond is effected by applying the adhesive to all adjoining surfaces. After sandwiching core 2 between sheets 4 and 5 with the adhesive layer applied to the contacting surfaces, the structure is placed in an oven and the thermosetting adhesive is allowed to cure until a maximum bond is reached between the core and sheets to form panel 1. The densified areas provide increased compressive strength for riveting the panel to other structure without eliminating the outstanding advantages evidenced over the more common types of paneling. The versatility of the core is illustrated in the drawings wherein the size of the hexagonal cells may vary in accordance with the strength requirements to produce a highly desirable structure.

One of the most important steps in producing the honeycomb core panel 1 is the method of obtaining uniformly densified areas within core 2. If cut-outs 6 and 7 were not made before densifying, the core would warp, setting up secondary stresses which would weaken the structure and substantially reduce its utility. Cut outs 6 and 7 enable the densifying to be done uniformly and where desirable, hence, it keeps the weight to a minimum.

It is to be understood that certain changes, alterations, modifications and substitutions can be made without departing from the spirit and scope of the appended claims.

I claim as my invention:

1. A method of making a honeycomb panel having intersecting locally densified portions comprising, laying out a pair of reinforcing sheets to the proper plan form size and shape of the finished panel, laying out a slab of honeycomb core material of the thickness finally desired in said panel and having the cell axes substantially perpendicular to the plane of said slab, shaping said slab to plan form dimensions greater, by the amount of densifying proposed, than the plan form dimensions of said sheets, removing core material located within the areas of intersection of those portions of said slab which are to be densified, densifying the remaining core material in said portions by collapsing the cells thereof substantially perpendicular to their axes, the removal of said core material permitting the resulting edges of the core material being densified to move together substantially without restriction during such densification whereby substantially uniform densification will obtain throughout said densified portions including the intersecting portions thereof, and bonding said sheets to the major faces of said slab so that said core material will be sandwiched therebetween with the cell axes thereof perpendicular to the plane of the resulting panel.

2. A method of making a honeycomb panel having intersecting, locally densified portions comprising, laying out a pair of reinforcing sheets to conform to the plan form size and shape of the finished panel, laying out a slab of honeycomb core material of the thickness finally desired in said panel having a plurality of cells with their axes substantially perpendicular to the plane of said slab, shaping said slab to plan form dimensions greater, by the amount of densifying proposed, than the plan form dimensions of said sheets, removing core material located within the areas of intersection of those portions of said slab which are to be densified, densifying the remaining core material in said portions by applying a compressive force substantially perpendicular to said cell axes, the removal of said core material permitting the resulting edges of the core material being densified to move together substantially without restriction during such densification whereby substantially uniform densification will obtain throughout said densified portions including the intersecting portions thereof, and bonding said sheets to the major faces of said slab so that said core material will be sandwiched therebetween with the cell axes thereof perpendicular to the plane of the resulting panel.

3. A method of making a sandwich panel having locally densified portions comprising, laying out a pair of metal reinforcing sheets to conform to the plan form size and shape of the finished panel, laying out a slab of metal cellular core material of the thickness finally desired in said panel and having the cell axes substantially perpendicular to the plane of said slab, shaping said slab to plan form dimensions greater, by the amount of densifying proposed, than the plan form dimensions of said sheets, locally densifying said core by collapsing said cells substantially perpendicular to their axes in areas requiring greater compressive strength, and then bonding said sheets to said slab of core material.

4. A panel comprising a cellular metal honeycomb core securely bonded between metal reinforcing sheets with the axes of the cells all extending through the panel from one reinforcing sheet to the other, said core including a portion having a plurality of substantially hexagonal cells and a portion, integral with said first portion, wherein said cells are collapsed substantially perpendicular to their axes for locally increasing said panel's compressive strength.

5. A panel comprising a low-density, cellular metal core securely bonded to and between metal reinforcing sheets with the axes of the cells all extending through the panel from one reinforcing sheet to the other, said core comprising open-celled portions bordered by intersecting densified portions integral therewith, said densified portions having the cells collapsed substantially perpendicular to their cell axes for resisting local high compression loading on said panel.

6. A panel comprising a low-density, cellular metal core securely bonded to and between metal reinforcing sheets by a thermosetting adhesive with the axes of the cells all extending through the panel from one reinforcing sheet to the other, said core comprising a plurality of cells, the cells in predetermined areas having their cell walls collapsed substantially perpendicular to their cell axes to form intersecting densified portions for resisting high compression loading, said densified portions having their intersecting areas densified to substantially the same degree as their non-intersecting areas.

7. A panel comprising a low-density metal cellular core constructed of intermittently connected foil strips securely bonded to and between metal reinforcing sheets, said core including a first portion having a plurality of open, fully-expanded cells and a second portion integral with said first portion wherein the cells are collapsed substantially perpendicular to their axes for locally increasing the compressive strength of the panel, said core being so arranged that all the cells in each of said portions have their axes extending through the panel from one reinforcing sheet to the other and said core being constructed with the original individual foil strips of which said core is made extending uninterruptedly from the first portion into the second.

(References on following page)

References Cited in the file of this patent

UNITED STATES PATENTS

| | | | |
|---|---|---|---|
| 317,868 | Smith | May 12, | 1885 |
| 1,189,140 | Lane | June 27, | 1916 |
| 1,532,049 | Dowling | Mar. 31, | 1925 |
| 1,674,974 | Lorenz | June 26, | 1928 |
| 1,800,800 | Kerby | Apr. 14, | 1931 |
| 1,925,804 | Hiering | Sept. 5, | 1933 |
| 2,077,729 | Wilcox | Apr. 20, | 1937 |
| 2,086,225 | Hiering | July 6, | 1937 |
| 2,089,242 | Whitesell | Aug. 10, | 1937 |
| 2,212,481 | Sendzimir | Aug. 20, | 1940 |
| 2,271,900 | Mowbray | Feb. 3, | 1942 |
| 2,299,614 | Deutsch | Oct. 20, | 1942 |
| 2,333,343 | Sendzimir | Nov. 2, | 1943 |
| 2,333,600 | Trautvetter | Nov. 2, | 1943 |
| 2,385,352 | Davis | Sept. 25, | 1945 |
| 2,428,979 | May | Oct. 14, | 1945 |
| 2,436,278 | Willett | Feb. 17, | 1948 |
| 2,576,698 | Russum | Nov. 27, | 1951 |